(12) United States Patent
Yanagi

(10) Patent No.: US 6,498,619 B1
(45) Date of Patent: Dec. 24, 2002

(54) VIDEO SIGNAL OUTPUT ARRANGEMENT FOR AUTO-PRINTER

(75) Inventor: Kouji Yanagi, Ohmiya (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 08/457,226

(22) Filed: Jun. 1, 1995

(30) Foreign Application Priority Data

Jun. 10, 1994 (JP) .............................................. 6-151827

(51) Int. Cl.$^7$ ........................... H04N 5/253; H04N 5/91
(52) U.S. Cl. ......................... 348/96; 386/122; 386/125
(58) Field of Search ............................ 348/96–99, 104, 348/207, 209, 722; 358/335, 342; 386/46, 52, 121, 122, 125, 126

(56) References Cited

U.S. PATENT DOCUMENTS

| | | | | |
|---|---|---|---|---|
| 4,727,418 A | * | 2/1988 | Kato et al. | 358/98 |
| 4,809,064 A | * | 2/1989 | Amos et al. | 358/76 |
| 4,958,237 A | * | 9/1990 | Kubota | 358/451 |
| 5,010,498 A | * | 4/1991 | Miyata | 364/519 |
| 5,121,198 A | * | 6/1992 | Maronian | 358/76 |
| 5,381,526 A | * | 1/1995 | Ellson | 395/164 |
| 5,469,536 A | * | 11/1995 | Blank | 395/131 |
| 6,020,982 A | * | 2/2000 | Yamauchi et al. | 358/444 |

OTHER PUBLICATIONS

RGB product literature, RGB/videolink (TM), 1992.*

* cited by examiner

Primary Examiner—David Vincent

(74) Attorney, Agent, or Firm—Price, Heneveld, Cooper, DeWitt & Litton

(57) ABSTRACT

A video signal output arrangement for auto-printer generally includes a converter having an image pickup device and a video signal processor unit both functioning to convert an image on photographic film to a corresponding video signal, an interface serving to branch this video signal, and an output terminal to provide the video signal to the exterior of the auto-printer. The video signal output arrangement allows an image on the photographic film to be displayed on an external monitor or to be recorded on an external recording device and is electrically connectable to a communication line. A path of light rays extending from the photographic film, through which the light rays have been transmitted, to photosensitive material is branched so as to be directed to a photometric device 56, on one hand, and to an image pickup device 58, on the other hand. Information detected by devices 56 and 58 are inputted to a video signal processor unit 60 by which the information is converted to the corresponding video signals. The video signal is branched by interface 60 having one output electrically connected to a built-in monitor 38, another output electrically connected to an RGB signal output terminal 64, and still another output electrically connected via a matrix circuit 66 to a composite signal output terminal 68. The external monitor may be electrically connected to the output terminal 64 or 68 and thereby the image to be printed may be examined on the external monitor in the same manner as on the built-in monitor 38.

15 Claims, 2 Drawing Sheets

VIDEO SIGNAL OUTPUT ARRANGEMENT FOR AUTO-PRINTER

BACKGROUND OF THE INVENTION

1. Field of the Invention

The present invention relates to a video signal output arrangement for an auto-printer, in order to provide an auto-printer with a video signal representing an image on film to be printed by the auto-printer.

2. Description of the Related Art

An auto-printer generally comprises stations such as a printing station and a processor station, wherein photographic paper is continuously fed from a roll to the printing station and successively exposed to an image on a photographic original such as a negative film.

As will be apparent from FIG. 3 in the accompanying drawings, an auto-printer further has, on the front side of the printing station, an operating table 2 for supporting negative film 1. Below the negative film, there are provided a suitable filter 4 and a light-emitting lamp 6. Above the negative film 1 there are provided a lens 8, a shutter 10 and a reflector 12, which define an optical system $S_o$ adapted to direct the light rays emitted from the light-emitting lamp 6 to photographic paper carried by a mask device (not shown) of said printing station.

Above the negative film 1 and below the lens 8 there is provided a semitransparent mirror 14. Behind this semitransparent mirror 14, as viewed in its reflecting direction, there are provided another lens 16 and another semitransparent mirror 18. Behind semitransparent mirror 18, as viewed in its transmitting direction, there is provided a photometric device 20; for example, an SPD. Above semitransparent mirror 18, as viewed in its reflecting direction, there is provided a CCD 22.

Before the exposure operation is performed, light-emitting lamp 6 is energized to irradiate negative film 1 with the light rays coming from light-emitting lamp 6 through the filter 4. After being transmitted through semitransparent mirror 14 and lens 8, the image on the negative film 1 is intercepted by shutter 10. Simultaneously the image is reflected rearward by semitransparent mirror 14 and passed through lens 16. After the optical path has been branched by semitransparent mirror 18, the image is incident on the photometric device 20, on one hand, and on the CCD 22, on the other hand, the former serving to detect brightness information and the latter serving to detect the remaining information of the image.

The information detected by photometric device 20 and CCD 22 are inputted to a video signal processor unit 24 and converted into video signals. These video signals are then inputted to a built-in monitor 26 which then displays the image represented by the video signals.

Built-in monitor 26 is situated in the proximity of the auto-printer's operator's table; namely, laterally above the operator's table. With the aid of the image displayed on the built-in monitor 26, the operator can visually check the image to be printed before the exposure operation is performed. In this manner, the operator can achieve the optical exposure effect by visually checking various factors of the image to be printed, such as brightness and color tone, from the image displayed on built-in monitor 26 before the exposure operation is performed. Accordingly, it is possible even for an inexperienced operator to obtain a picture of high quality without difficulty.

Such conventional auto-printer, as has been described above, is not without its difficulties. Because the built-in monitor 26 is laterally above the operator's table 2, it is unable to have a large screen, which would be required to check details of the image. In addition, built-in monitor 26 is provided integrally with the auto-printer proper so that only the printing operator can use the monitor 26. It is not possible for the customer who ordered the printing project to check the image for final approval of the brightness and color tone. Accordingly, it would be desirable for the auto-printer to have an additional monitor to complement built-in monitor 26.

SUMMARY OF THE INVENTION

The present invention is directed to overcoming the difficulties of known auto-printers, as discussed above, by providing a video signal output arrangement for an auto-printer that is improved in a manner which functionally complements the built-in monitor.

To accomplish this result, the invention generally resides in a video signal output arrangement for an auto-printer. The video signal output arrangement includes converter means to convert an image recorded on photographic original to corresponding video signals and output means to provide said video signals to an external port. The photographic original is preferably a negative film.

Preferably, a branching means is provided in a path extending from said converter means to said output means. A built-in monitor, which is adapted to convert the video signals to an image, is electrically connected in a manner that the branching means may function to branch the video signals output from the converter means to the output means and to said built-in monitor. The output means may be electrically connected to a recording device used to record the video signals on recording medium, a CRT display unit, or a communication line. The recording medium may be a video disk or a photo-compact disk. The converter means preferably includes an image pickup means, a photometric device, and an appropriate processor circuit.

The invention is embodied in a video signal output arrangement for an auto-printer, wherein the video signal output arrangement includes a semitransparent mirror placed in an optical path extending from the photographic original to the photosensitive material in a manner that will branch the optical path. Another semitransparent mirror is placed in this branched optical path in a manner that will direct light rays onto a photometric device, on one hand, and to an image pickup means, on the other hand. A video signal processor unit is provided that is adapted to receive output signals from these photometric device and image pickup means and to convert these signals into the corresponding video signals. A branching means is supplied with output signals from said video signal processor unit. A built-in monitor converts the video signals into a corresponding image. The built-in monitor and an output means are electrically connected to said branching means. The video signal may be an RGB signal, a composite signal or a component signal.

Before the photographic original in the form of negative film is subjected to the exposure process, the film is irradiated with light rays coming from a light-emitting lamp. An image on the film is inputted to the image pickup means, such as imaging element, and to the photometric device. The image is converted by said image pickup means into corresponding electronic signals. The photometric device detects a brightness of said image. Information thus obtained by said image pickup means and said photometric device, respectively, is then processed in the processor circuit and applied in the form of video signals to the branching means. It should be understood that the video signals will be of a type appropriately selected from various types under processing by said processor circuit.

One output terminal of said branching means is electrically connected to the built-in monitor so that said video signals may be applied to the built-in monitor to display the image on the monitor. The other output terminal of said branching means is electrically connected to an external terminal exposed to the exterior of the auto-printer so that an external monitor, such as a suitable CRT display unit, may be connected to this external monitor terminal.

When a large-scaled monitor is electrically connected to said external monitor terminal, the image can be displayed on this large-scaled monitor so that details of said image may be easily observed. If the external monitor is electrically connected to said external monitor terminal using an extension cable. The external monitor can be placed at a station remote from the auto-printer proper where the customer who ordered the printing project may check the image to thereby approve the brightness and color tone prior to printing the image.

Actual operation of printing is started by the operator after the operator has adjusted the color tone and brightness of the image while visually checking the image on the screen of the built-in monitor until the proper image is obtained.

If said external monitor terminal is electrically connected to a communication line, the video signals can be transmitted by said line to the remote station and the external monitor placed at this remote station can receive the video signals and display the corresponding image thereon. If said terminal for external monitor is electrically connected to a suitable recording device, such as a video disk or a photo-compact disk, the video signals can be recorded on the recording medium.

DETAILED DESCRIPTION OF THE EMBODIMENT

The video signal output arrangement for auto-printer according to the invention will be understood more specifically from the following description of the presently preferred embodiment made in reference with the according drawings.

Figure 2:
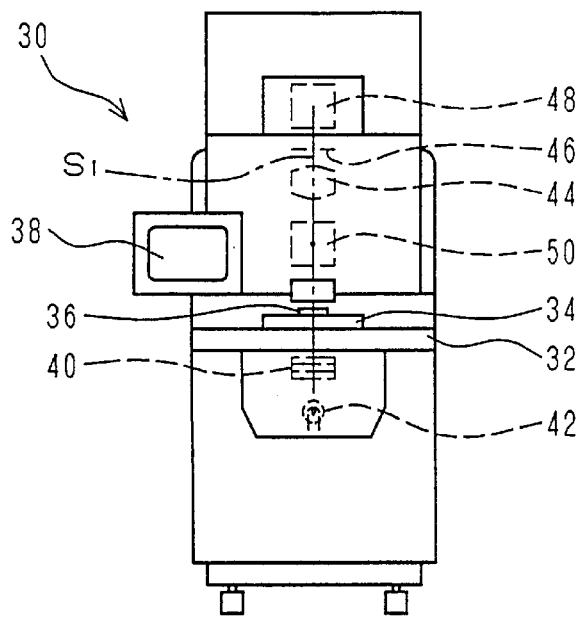
FIG. 2 is a front elevation of the auto-printer in FIG. 1.
Figure 3:
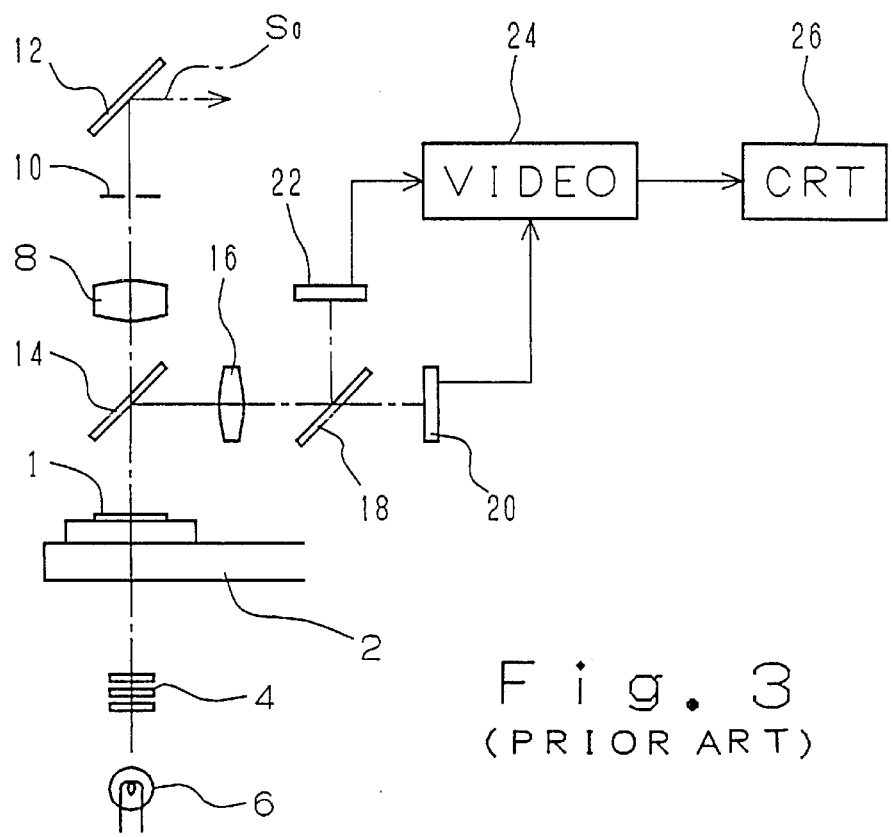
FIG. 3 is similar to FIG. 1, but showing a conventional auto-printer.

Referring to FIG. 2, an auto-printer 30 has, on a front side of its printing station, an outwardly extending operator's table 32 and a film carrier 34 placed on a top surface of operator's table 32. Film carrier 34 detachably holds a photographic original such as negative film 36. Film carrier 34 is adjustably positionable both longitudinally and transversely to accommodate itself to a particular width of a photosensitive material, such as the photographic paper on which the image is to be printed. A built-in monitor 38 of appropriate size, located laterally above the operating table 32, is provided integrally with auto-printer 30.

Figure 1:
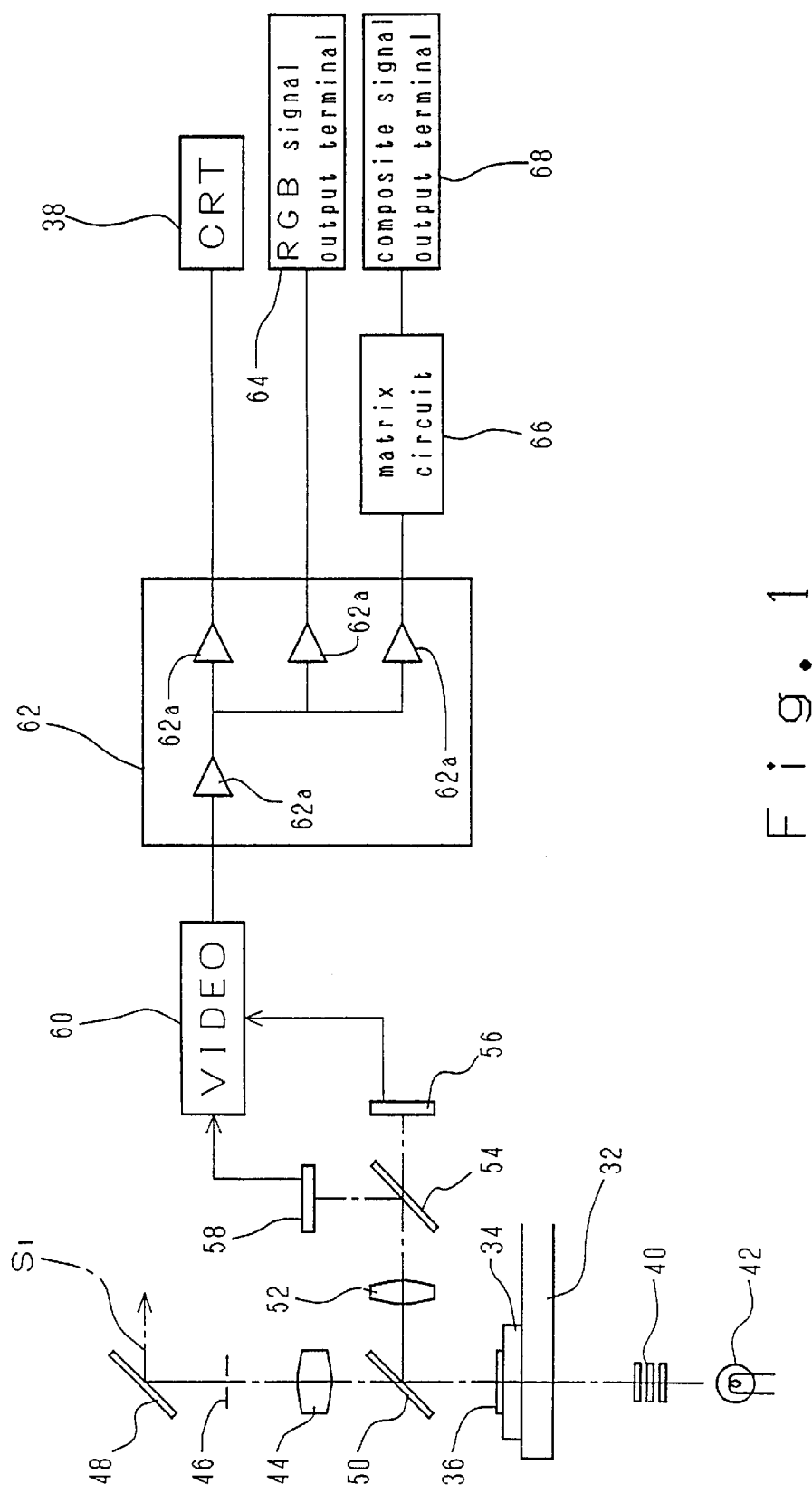
FIG. 1 is a block diagram showing a video signal output arrangement for an auto-printer, according to the invention.

Referring to FIGS. 1 and 2, a suitable filter 40 and a light-emitting lamp 42 are provided below negative film 36. A lens 44, a shutter 46, and a reflector 48 are provided above negative film 36 in order to define an optical system $S_1$ directing light rays coming from the light-emitting lamp 42 to photographic paper carried by a mask device (not shown) in the printing station.

A semitransparent mirror 50 is provided above negative film 36. A lens 52 and another semitransparent mirror 54 are provided behind semitransparent mirror 50, as viewed in its reflecting direction. In one of multiple optical paths branched by semitransparent mirror 54, there is provided a photometric device 56 which is of the SPD type in the illustrated embodiment. In the other of the multiple optical paths branched by semitransparent mirror 54, there is provided an image pickup device 58 which is of the CCD type in the illustrated embodiment. Photometric device 56 is electrically connected to a control unit (not shown) which determines brightness of the image and adjusts various factors, such as exposure time for printing as a function of image brightness.

Photometric device 56, as well as image pickup device 58, are electrically connected to a video signal processor unit 60. Photometric device 56, image pickup device 58, and video signal processor unit 60 constitute a converter means. Video signal processor unit 60 is electrically connected to branching means in the form of an interface 62 by which appropriate branching is effected. A first branch line of interface 62 has an amplifier 62a having an output electrically connected to built-in monitor 38. A second branch line of interface 62 has an amplifier 62 having an RGB signal output electrically connected with terminal 64 and the other components. When the video signals transmitted from video signal processor unit 60 are in the form of RGB signals, a third branch circuit of interface 62 is electrically connected to a matrix circuit 66 which is, in turn, electrically connected to a composite signal output terminal 68.

The video signal output arrangement for auto-printer constructed of the invention constructed as has been described above operates as follows:

The operator inserts the negative film 36, or the like, into the film carrier 34 and energizes the light emitting lamp 42. Light rays emitted from lamp 42 pass through filter 40 and irradiate negative film 36. As a result, light rays defining the image on negative film 36 pass through semitransparent mirror 50 and lens 44, and are intercepted by shutter 46.

The light rays defining the image are reflected along another path rearwardly by semitransparent mirror 50, then transmitted through lens 52 branched by semitransparent mirror 54. The light rays defining the image are incident upon photometric device 56, on one hand, and upon image pickup device 58, on the other hand. In this manner, photometric device 56 may detect brightness information and image pickup device 58 may detect the other information about the image. Brightness information detected by photometric device 56 is inputted to a control unit (not shown) to determine an appropriate exposure time or the other factor for the exposure to be subsequently performed.

Respective information thus detected are inputted to video signal processor unit 60 in which the information is converted to a corresponding video signal. This video signal is inputted to interface 62 within which the signal is branched. The video signal on one of these branched lines is applied to built-in monitor 38, which then converts the video signal again to the image to be displayed on the screen of built-in monitor 38.

The video signal on another branch line is applied to the RGB signal output terminal 64. If a monitor relying on the RGB inputted is electrically connected to this RGB signal output terminal 64, the video signal will be converted by this monitor to the corresponding image to be displayed on the screen of this monitor.

The video signal on still another branch line is converted via a matrix circuit 66 to a composite signal which is, in turn, applied to a composite signal output terminal 68. If a monitor relying on such composite signal is electrically connected to this composite signal output terminal 68, the composite signal is converted by this monitor to the corresponding image to be displayed on the screen of this monitor.

The operator examines the image on built-in monitor 38, as well as on the external monitor, and adjusts brightness as well as color tone thereof until the desired image is displayed, whereupon the exposure operation is performed. At this time, shutter 46 is opened, allowing the light rays of the image having passed lens 44 to be reflected by reflector 48 and then to be projected onto the photographic paper carried by the mask device (not shown). In this manner, the exposure operation is performed. After a preset exposure time has elapsed, shutter 46 is again closed. The operation exposure is thus completed and the auto-printer is ready for the next frame of photographic paper.

As will be apparent from the foregoing description, the present invention may be embodied in a video signal output arrangement having image pickup device 58 and photometric device 56, both adapted to convert the image on the negative film 36 to the corresponding video signals, video signal processor unit 60, RGB signal output terminal 64, and composite signal output terminal 68, both adapted to provide these video signals to the exterior, so that a large-sized monitor may be electrically connected to RGB signal output terminal 64 or composite signal output terminal 68 and thereby the image to be printed may be easily examined in detail. Consequently, the function of the relatively small-sized built-in monitor 38 is effectively complemented by said large-sized monitor to obtain a picture of higher quality.

The external monitor may be electrically connected to RGB signal output terminal 64 or composite signal output terminal 68 via an extension cable in order that the monitor can be placed on a counter of the print shop or the like. The customer having ordered the printing will be able to examine the image to be printed for the purpose of color designation or the like. Thus, a picture satisfying the customer can be easily and reliably printed and the picture quality will be significantly improved over the picture produced by conventional auto-printing, in which the printing is fully left to the judgment of the operator. An external monitor placed on the counter can be used also for various other purposes, such as demonstration and advertisement of the shop or display.

An appropriate recording device may be electrically connected to RGB signal output terminal 64 or composite signal output terminal 68 in order to record the video signals on an appropriate recording medium, such as video disk or photo-compact disk. This allows the operation of such recording to be performed simultaneously with the operation of printing rather than recording the printed picture on the recording medium after such picture has been read by a scanner or the like. In this way, the operation can be speed up. Furthermore, the resulting record of printed pictures, as well as various data associated with the operation of printing, will be useful for subsequent operation of printing.

A video printer may be electrically connected to RGB signal output terminal 64 or composite signal output terminal 68 to achieve printing with the video printer. This improves the flexibility of the photographic representation because the video printer can achieve special printing treatment which is impossible with ordinary photographic paper destined to be subjected to normal exposure.

A communication line may be electrically connected to RGB signal output terminal 64 or composite signal output terminal 68 to receive the video signal at a remote location. This allows video signals output from a plurality of auto-printers to be collectively managed at a single main office. For example, if built-in monitor 38 is provided with a function of displaying a fault mode when any one of the auto-printers is out of order, such fault mode will be displayed on the screen of said monitor placed at said main office and thus such disordered state can be detected at the remote location. Therefore, it is possible for even a repairman being remote from a job site, at the remote location such as the main office, to perform rapid repairs, because the repairman can make adequate preparation at the main office before arrival at the job site.

According to this embodiment, the video signal output arrangement includes the RGB signal output terminal 64 and the composite signal output terminal 68 so that a monitor of the RGB signal type or of the composite signal type may be selectively connected to the video signal output arrangement. In this manner, existing monitors can be effectively used with the arrangement according to the invention. It should be understood that the video signal may be of any type other than such RGB signal and such composite signal. For example, the output arrangement may be provided with a matrix circuit to output the component signal. The output arrangement may be adapted also to output a video signal of newly developed type.

As will be apparent from the foregoing description, the video signal output arrangement for auto-printer of the invention includes a converter means adapted to convert the image on the negative film to the video signals and output means adapted to provide these video signals to the exterior so that the external monitor may be electrically connected to said output means and thereby the image to be printed may be examined on the screen of this external monitor. If an external monitor having a large screen is used, the image can be easily examined in detail. If the external monitor is electrically connected to said output means via the extension cable, the external monitor can be placed at any desired location. This contributes to improvement of picture quality.

It is also possible to connect appropriate recording device, a video printer or a communication line to said output means. Functional flexibility of the auto-printer is thereby significantly improved.

The branching means is provided in the path extending from said converter means to said output means. The built-in monitor serving to again convert the video signals to the image is electrically connected to said branching means so that the external monitor may functionally complement the built-in monitor. Accordingly, the printing operation can be more efficiently performed by normally using the built-in monitor and, when it is desired, using the external monitor.

The converter means is composed of the imaging element, the photometric device and an appropriate processor unit so that the image on the negative film may be converted to the video signal as reliable information. More specifically, the photometric device detects a brightness of the image in order to determine the optimal print exposure time and the imaging element optimizes conversion of the image to the video signal so that the brightness as well as the color tone of the image displayed by the monitor may be substantially equal to those of the image to be printed.

The processor unit can be modified so that different video signals such as an RGB signal, a composite signal, and a component signal may be transmitted therefrom. In this manner, the desired video signal type may be selected for connection of the monitor.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. An auto-printer comprising:
   a housing;
   image reading means disposed in said housing for reading an image recorded on a photographic original;
   converter means disposed in said housing for converting the image read by said reading means to a corresponding video signal;
   output means disposed on said housing and coupled internally to said converter means for providing said video signal to a device external to said housing;
   branching means disposed within said housing and provided in a path extending from said converter means to said output means; and
   a built-in monitor disposed within said housing and adapted to convert said video signal back to the image, said built-in monitor is electrically connected to the branching means in a manner that the branching means branches the video signals output from said converter means to said output means and to said built-in monitor.

2. The auto-printer according to claim 1, wherein said output means produces video signals suitable for a recording device used to record said video signals on recording medium.

3. The auto-printer according to claim 2, wherein said recording medium comprises a video disk.

4. The auto-printer according to claim 2, wherein said recording medium comprises a photo-compact disk.

5. The auto-printer according to claim 2, wherein said video signal is selected from a group consisting of an RGB signal, a composite signal, and a component signal.

6. The auto-printer according to claim 1, wherein said output means produces video signals suitable for a CRT display unit electrically connected to said output means.

7. The auto-printer according to claim 6, wherein said video signal is selected from a group consisting of an RGB signal, a composite signal, and a component signal.

8. The auto-printer according to claim 1, wherein said output means produces video signals suitable for a communication line electrically connected to said output means.

9. The auto-printer according to claim 8, wherein said video signal is selected from a group consisting of an RGB signal, a composite signal, and a component signal.

10. The auto-printer according to claim 1, wherein said converter means includes image pickup means, a photometric device and a processor unit.

11. The auto-printer according to claim 10, wherein said video signal is selected from a group consisting of an RGB signal, a composite signal, and a component signal.

12. The auto-printer according to claim 1, wherein said video signal is selected from a group consisting of an RGB signal, a composite signal, and a component signal.

13. An auto-printer comprising:
   a housing;
   a first semitransparent mirror disposed in said housing and placed in an optical path extending from a photographic original to a photosensitive material so as to branch said optical path;
   a second semitransparent mirror disposed in said housing and placed in the optical path branched by said first semitransparent mirror so as to direct light rays onto a photometric device and to image pickup means;
   a video signal processor unit disposed in said housing and adapted to receive output signals supplied from said photometric device and said image pickup means and to convert these output signals into a corresponding video signal;
   branching means disposed in said housing and adapted to receive said video signal from said video signal processor unit;
   output means disposed on said housing and electrically connected to said branching means for providing video signals to a device external to said housing; and
   a built-in monitor disposed in said housing and internally coupled to said branching means to convert said video signal back to the corresponding image for display to an operator.

14. The auto-printer according to claim 13, wherein said video signal is selected from a group consisting of an RGB signal, a composite signal and a component signal.

15. An auto-printer comprising:
   a housing;
   image reading means disposed in said housing for reading an image recorded on a photographic original;
   converter means disposed in said housing for converting the image read by said reading means to a corresponding video signal;
   output means disposed on said housing and coupled internally to said converter means for providing said video signal to a device external to said housing; and
   branching means disposed within said housing and coupled between said converter means and said output means for providing a plurality of video signals to said output means for delivery to a plurality of external devices.

* * * * *